Aug. 7, 1923.

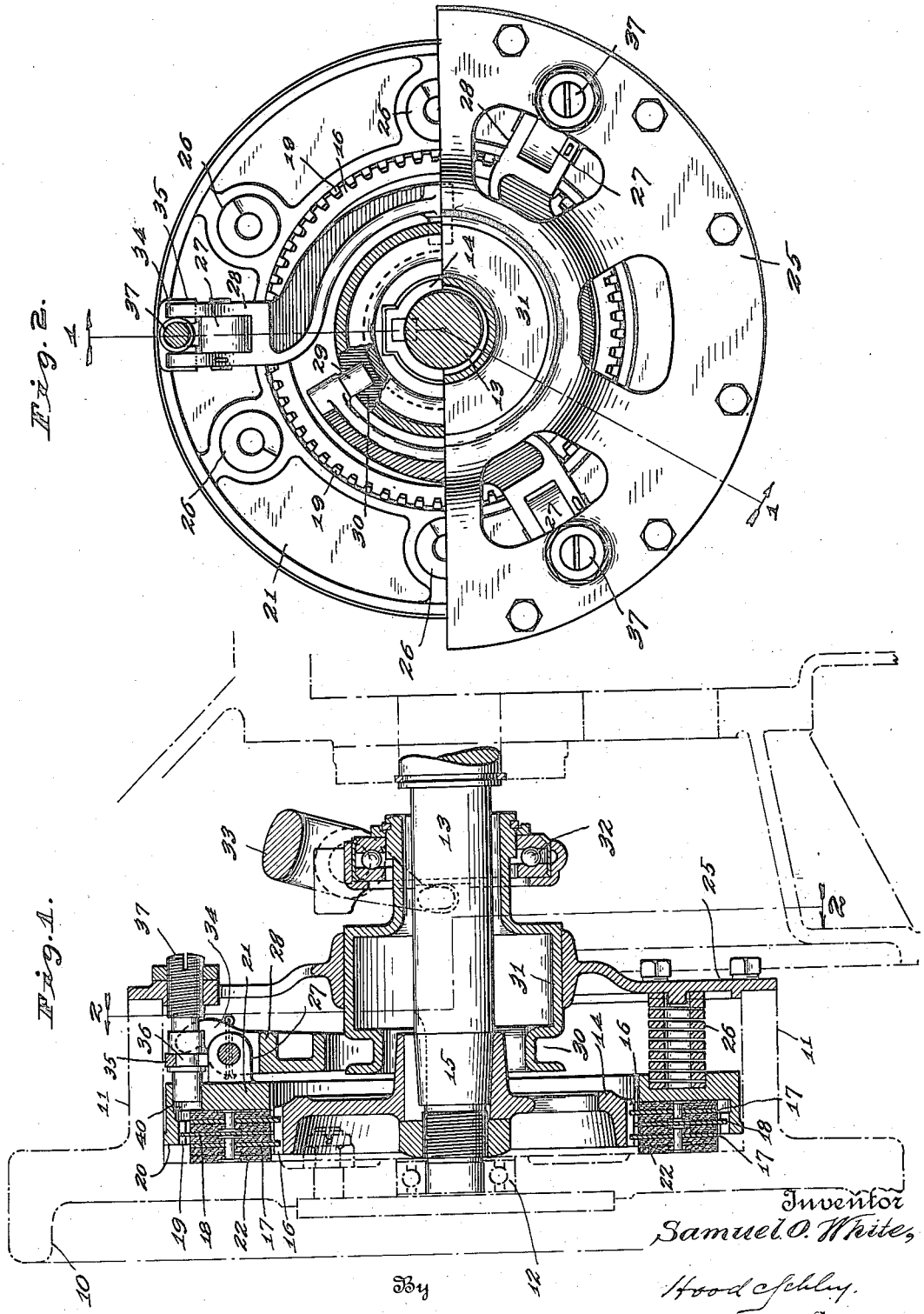

S. O. WHITE

CLUTCH

Filed Feb. 28, 1920

1,464,489

2 Sheets-Sheet 2

Inventor
Samuel O. White,
By
Hood & Schley.
Attorneys

Patented Aug. 7, 1923.

1,464,489

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

CLUTCH.

Application filed February 28, 1920. Serial No. 361,916.

*To all whom it may concern:*

Be it known that I, SAMUEL O. WHITE, a citizen of the United States, residing at Muncie, in the county of Delaware and State of Indiana, have invented a new and useful Clutch, of which the following is a specification.

It is the object of my invention to produce a clutch which will combine the advantages of the single-plate clutch, the principal one of which is ease in gear-shifting on account of the extreme lightness of the driven members, with the advantages of the multiple-disk clutch, such as soft and gradual engagement and long life; and to do this by a structure which can be associated with a standard type of fly wheel, which permits the relative sliding of the parts with ease without the necessity for the loose fits which are so often required in single-plate clutches, and in which (in the preferred form) the driving members of the clutch are driven from the rear cover plate without requiring any direct connection with the fly wheel proper save as such cover plate is attached to the fly wheel.

Figure 3:
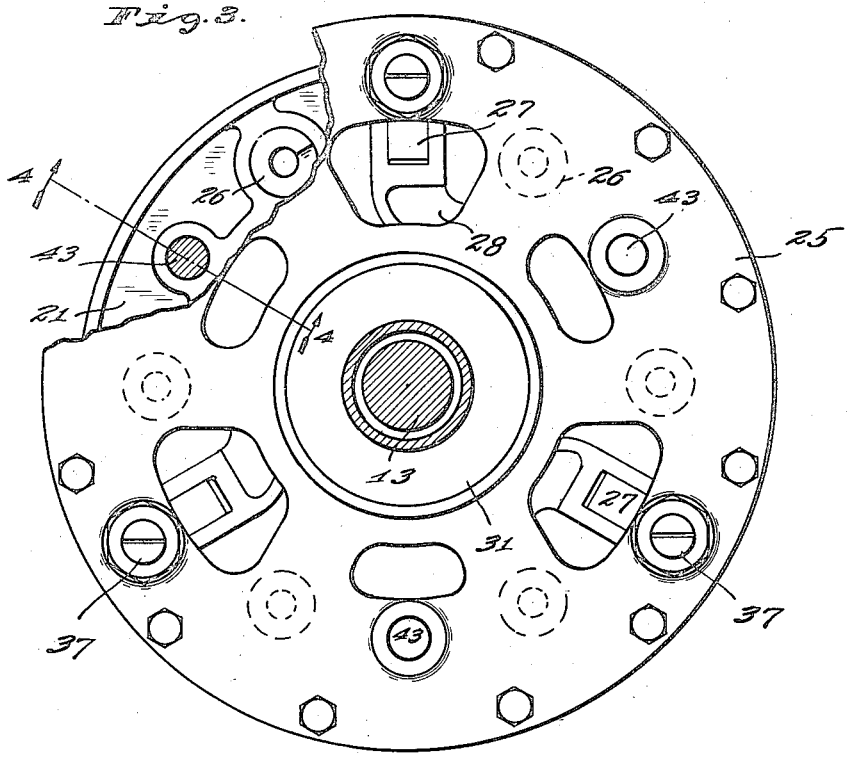
Figure 5:
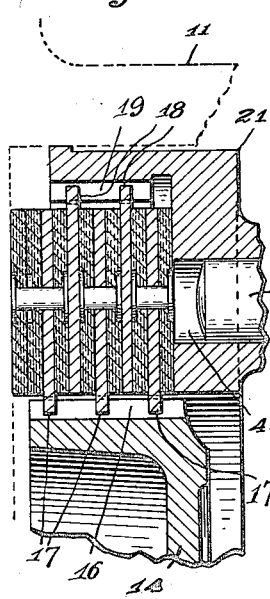
Figure 4:
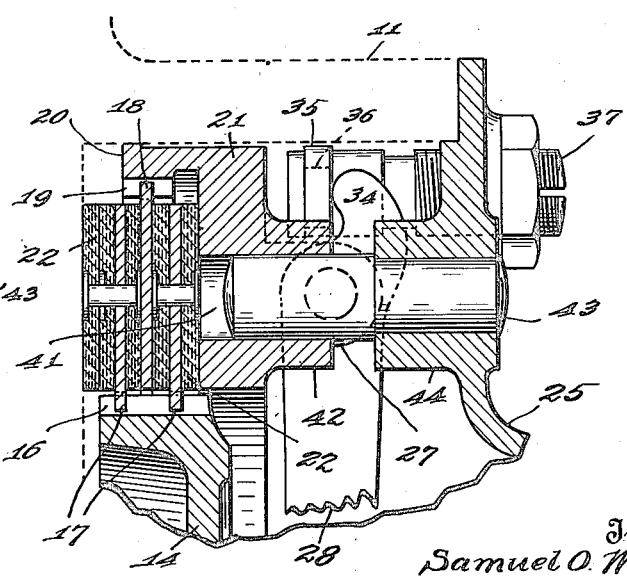

The accompanying drawings illustrate my invention. Fig. 1 is a single longitudinal section through a clutch embodying my invention, with the fly wheel and some other associated parts indicated in broken lines, being taken substantially on the line 1—1 of Fig. 2; Fig. 2 is a tranverse section on the line 2—2 of Fig. 1; Fig. 3 is a rear elevation of the clutch, with the cover plate partly broken away, to show a somewhat different driving arrangement for the driving members from that shown in Figs. 1 and 2; Figs. 4 is an enlarged detail section on the line 4—4 of Fig. 3; and Fig. 5 is a fragmentary view similar to Fig. 4, but showing a modification.

The fly wheel 10 is of a standard type, having a rearwardly projecting annulus 11 which surrounds the various clutch parts, and also having a suitable bearing 12 supporting the forward end of the driven shaft 13. This is standard.

A drum 14 is keyed on a tapered portion 15 of the driven shaft 13, near the forward end of the latter, and is provided with external gear teeth 16 which serve as splines interfitting with internal gear teeth cut on annular driven plates 17 of sheet metal; Figs. 1 and 4 show two driven plates, and Fig. 5 shows three. The drum 14 is of large diameter, in comparison with the shaft 13, and because of that and of the number of gear teeth the pressure on each gear tooth spline is made relatively small and relative sliding may easily be obtained without the necessity for an unduly loose fit. Between each two adjacent driven plates 17 is a driving plate 18, also annular and of sheet metal, the inner edge of the driving plate 18 being clear of the teeth 16; Figs. 1 and 4 show one such driving plate, and Fig. 5 shows two. The outer edge of the driving plate 18, or of each driving plate if there are more than one, is provided with external gear teeth which serve as splines interfitting with internal gear teeth 19 on a forwardly projecting annular rim 20 from a pressure plate 21 slidable axially within the annulus 11 of the fly wheel 10 and having suitable guiding bearings on the inner face of such annulus. Friction facings or mats 22 are located on both sides of each driven plate 17, between such plate and the adjacent members; which latter are the fly wheel proper, the driving plate 18, and the pressure disk 21. These friction facings are most conveniently riveted to the driven plates 17 against which they abut, but this is not necessary. There is a double layer of friction facing between the forward driven disk 17 and the fly wheel 10, both facings being riveted to such driven disk. This is to space such driven disk far enough away from the fly wheel to give plenty of clearance so that there will be no opportunity for the forward driven disk to drop off the forward end of the drum 14 in the event of considerable wear on the facings.

Bolted to the rear edge of the annulus 11 is a cover plate 25, between which and the pressure plate 21 are located a circular series of coiled compression springs 26 which tend to push the pressure plate 21 forward to clamp the fly wheel, pressure plate, driving disk or disks, and driven disks all together—in other words, to set the clutch. In order to release the clutch, the pressure plate 21 has three rearwardly extending ears 27, on which are pivoted retracting levers 28, which are curved as shown in Fig. 2 and at their inner ends are provided with inward projections 29 (which may be rollers) located in the groove 30 of an axially shiftable sleeve 31 supported in suitable bearings at the center of the cover plate 25 and connected through the usual thrust bearing 32 to the usual clutch-releasing yoke 33 operated by the usual foot pedal. The movement of the clutch yoke 33 thus moves the inner ends of the retracting levers 28. These retracting levers also have outwardly projecting fingers 34, projecting outward beyond the pivotal support in the ears 27. These fingers 34 bear against the rear faces of the notched abutment plates 35 which are set in circumferential grooves 36 in adjusting screws 37 mounted and projecting rearwardly from the cover plate 25. By turning these screws 37 the abutment plates 35 may be adjusted toward and from the cover plate 25, to adjust the clutch. Each abutment plate is independently adjustable, by its individual screw 37. With this arrangement, the depressing of the clutch pedal moves the inner ends of the retracting levers 28 toward the rear, and the fingers 34 are fulcrumed on the abutment plates 35 so that such rearward movement also produces a rearward movement of the pressure plate 21 to release the clutch. This movement of the pressure plate 21 is a positive movement, against the springs 26, and is not the mere releasing of the spring pressure.

The pressure plate 21 is preferably driven from the cover plate 25, though for certain features of my invention this is not necessary and the pressure plate may be driven otherwise to rotate with the fly wheel and is axially movable relatively thereto. I show two ways of doing this. In the arrangement shown in Fig. 1, the adjusting screws 37 project forwardly beyond the abutment plates 35 and into registering holes in the rear face of the pressure plate 21, such plate being provided with bosses 40 at such holes if desired. These holes 40 are at a considerable distance from the axis, and it is possible to have a fairly accurate fit without causing binding. With this arrangement the fly wheel 10 drives the cover plate 25 through the bolts interconnecting them, the cover plate carries the adjusting screws 37 around with it and the fly wheel, and the forward ends of the screws 37 drive the pressure plate 21. The pressure plate in turn drives the driving plate or plates 18, through the gear-teeth splines 19.

In the arrangement shown in Fig. 4, the pressure plate 21 has holes 41 corresponding to the holes 40 in the other arrangement, but located circumferentially at intermediate points between the adjusting screws. These holes 41 are provided in rather long rearwardly extending bosses 42, and receive rather large diameter pins 43 which are set in forwardly projecting bosses 44 in the cover plate 25. The pins 43 are preferably shouldered pins, with their larger ends forward, to prevent them from dropping out in case they become loose from heating of the clutch. With this arrangement, as in the other, the pressure plate 21 is thus driven by forwardly projecting pins carried by the cover plate 25, but here these driving pins are separate from the adjusting screws.

I claim as my invention:

1. In a clutch, the combination of a driving member, a driven shaft, a drum fixed on said shaft, two annular driven plates having a splined mounting on the exterior of said drum, an annular driving plate located between the two driven plates, a pressure plate between which and said driving member the driving and driven plates are located with the driven plates in power-transmitting juxtaposition to the pressure plate and to the driving member respectively, said pressure plate being provided with a projecting rim within which said driving plate has a splined mounting, and means for driving said pressure plate from said driving member, said pressure plate being shiftable axially relatively to the driving member to control the setting and releasing of the clutch.

2. In a clutch, the combination of a driving member, a driven shaft, two annular driven plates having a splined connection to said shaft, an annular driving plate located between the two driven plates, a pressure plate between which and said driving member the driving and driven plates are located with the driven plates in power-transmitting juxtaposition to the pressure plate and to the driving member respectively, said pressure plate being provided with a projecting rim within which said driving plate has a splined mounting, and means for driving said pressure plate from said driving member, said pressure plate being shiftable axially relatively to the driving member to control the setting and releasing of the clutch.

3. In a clutch, the combination of a driving member, a driven shaft, a drum fixed on said shaft, two annular driven plates having a splined mounting on the exterior of said drum, an annular driving plate located between the two driven plates, a pressure plate between which and said driving member the driving and driven plates are located with the driven plates in power-transmitting juxtaposition to the pressure plate and to the driving member respectively, said pressure plate being provided with a projecting rim within which said driving plate has a splined mounting, means for driving said pressure plate from said driving member, said pressure plate being shiftable axially relatively to the driving member to control the setting and releasing of the clutch, spring means tending to move the pressure plate to clamp the driving and driven plates between the pressure plate and the driving member to set the clutch, and means for moving said pressure plate in the opposite direction against said spring means to release the clutch.

4. In a clutch, the combination of a driving member, a driven shaft, two annular driven plates having a splined connection to said shaft, an annular driving plate located between the two driven plates, a pressure plate between which and said driving member the driving and driven plates are located with the driven plate in power-transmitting juxtaposition to the pressure plate and to the driving member respectively, said pressure plate being provided with a projecting rim within which said driving plate has a splined mounting, means for driving said pressure plate from said driving member, said pressure plate being shiftable axially relatively to the driving member to control the setting and releasing of the clutch, spring means tending to move the pressure plate to clamp the driving and driven plates between the pressure plate and the driving member to set the clutch, and means for moving said pressure plate in the opposite direction against said spring means to release the clutch.

5. In a clutch, the combination of a driving member having an axially projected annulus, a driven shaft, a drum fixed on said shaft within said annulus, a plurality of plates surrounding said drum comprising driving and driven plates alternately arranged, said driven plates having a splined mounting on the exterior of said drum, a pressure plate also located within said annulus, said pressure plate having a rim in which said driving plates have a splined mounting and being movable axially within said annulus to set and release the clutch, a cover plate mounted on said annulus, and a driving connection between said cover plate and said pressure plate.

6. In a clutch, the combination of a driving member having an axially projecting annulus, a driven shaft, a drum fixed on said shaft within said annulus, two driven plates having a splined mounting on the exterior of said drum, a driving plate located between the two driven plates, a pressure plate also located within said annulus, said pressure plate having a rim in which said driving plate has a splined mounting and being movable axially within said annulus to set and release the clutch, a cover plate mounted on said annulus, and a driving connection between said cover plate and said pressure plate.

7. In a clutch, the combination of a driving member having an axially projecting annulus, a driven shaft, two driven plates having a splined connection to said shaft, a driving plate located between the two driven plates, a pressure plate also located within said annulus, said pressure plate having a rim in which said driving plate has a splined mounting and being movable axially within said annulus to set and release the clutch, a cover plate mounted on said annulus, and a driving connection between said cover plate and said pressure plate.

8. In a clutch, the combination of a driving member having an axially projecting annulus, a driven shaft, a drum fixed on said shaft within said annulus, two driven plates having a splined mounting on the exterior of said drum, a driving plate located between the two driven plates, a pressure plate also located within said annulus, said pressure plate having a rim in which said driving plate has a splined mounting and being movable axially within said annulus to set and release the clutch, a cover plate mounted on said annulus, a driving connection between said cover plate and said pressure plate, spring means acting between said cover plate and said pressure plate to move the latter to set the clutch, and means for moving the pressure plate against the action of said spring means to release the clutch.

9. In a clutch, the combination of a driving member having an axially projecting annulus, a driven shaft, two driven plates having a splined connection to said shaft, a driving plate located between the two driven plates, a pressure plate also located within said annulus, said pressure plate having a rim in which said driving plate has a splined mounting and being movable axially within said annulus to set and release the clutch, a cover plate mounted on said annulus, a driving connection between said cover plate and said pressure plate, spring means acting between said cover plate and said pressure plate to move the latter to set the clutch, and means for moving the pressure plate against the action of said spring means to release the clutch.

10. In a clutch, the combination of a driving member having an axially projecting annulus, a driven shaft, a driven plate having a splined connection with said shaft and located within said annulus, a pressure plate located within said annulus and between which and said driving member said driven plate is located, a cover plate attached to said annulus, an adjustable driving connection between said cover plate and said pressure plate, said connection permitting axial sliding of said pressure plate, an operating lever for said pressure plate fulcrumed on said driving connection and adjustable therewith.

11. In a clutch, the combination of a driving member having an axially projecting annulus, a driven shaft, a driven plate having a splined connection to said shaft and located within said annulus, a pressure plate located within said annulus and between which and said driving member said driven plate is located, a cover plate attached to said annulus, adjustable screws extending through said cover plate and projecting into sockets in said pressure plate and forming a driving connection between said cover plate and pressure plate, and operating levers for said pressure plate fulcrumed on said screws.

12. In a clutch, the combination of a driving member, a driven shaft, a driven plate having a splined connection to said shaft, a pressure plate between which and the driving member said driven plate is located, a cover plate attached to said driving member, adjustable screws extending through said cover plate and socketing in said pressure plate, and operating levers for said pressure plate fulcruming on said screws.

13. In a clutch, the combination of a driving member, a driven shaft, a driven plate having a splined connection with said shaft, a pressure plate between which and said driving member said driven plate is located, a cover plate attached to said driving member, pins extending through said cover plate and engaging said pressure plate, means for adjusting said pins without affecting the axial movement of said pressure plate, and operating levers for said pressure plate fulcrumed on said pins.

14. In a clutch, the combination of a driving member, a driven shaft, two annular driven plates having a splined connection to said shaft, an annular driving plate located between the two driven plates, a pressure plate between which and said driving member the driving and driven plates are located with the driven plates in power-transmitting juxtaposition to the pressure plate and to the driving member respectively, said pressure plate being provided with a projecting member within which said driving plate has a splined mounting, and means for driving said pressure plate from said driving member, said pressure plate being shiftable axially relatively to the driving member to control the setting and releasing of the clutch.

15. In a clutch, the combination of a driving member, a driven shaft, two annular driven plates having a splined connection to said shaft, an annular driving plate located between the two driven plates, a pressure plate between which and said driving member the driving and driven plates are located with the driven plates in power-transmitting juxtaposition to the pressure plate and to the driving member respectively, said pressure plate being provided with a projecting member within which said driving plate has a splined mounting, means for driving said pressure plate from said driving member, said pressure plate being shiftable axially relatively to the driving member to control the setting and releasing of the clutch, spring means tending to move the pressure plate to clamp the driving and driven plates between the pressure plate and the driving member to set the clutch, and means for moving said pressure plate in the opposite direction against said spring means to release the clutch.

In witness whereof, I have hereunto set my hand at Muncie, Indiana, this twenty-fifth day of February, A. D. one thousand nine hundred and twenty.

SAMUEL O. WHITE.